(12) United States Patent
Tajiri et al.

(10) Patent No.: US 7,299,053 B2
(45) Date of Patent: Nov. 20, 2007

(54) CELLULAR COMMUNICATION APPARATUS AND CHANNEL CAPTURE METHOD

(75) Inventors: Hiroshi Tajiri, Tokyo (JP); Satoru Sakai, Tokyo (JP); Yasutaka Nakata, Kanagawa (JP); Takashi Gondoh, Tokyo (JP)

(73) Assignee: Sony Corporation (JP)

( * ) Notice: Subject to any disclaimer, the term of this patent is extended or adjusted under 35 U.S.C. 154(b) by 224 days.

(21) Appl. No.: 10/343,807

(22) PCT Filed: Jun. 12, 2002

(86) PCT No.: PCT/JP02/05857

§ 371 (c)(1),
(2), (4) Date: Feb. 4, 2003

(87) PCT Pub. No.: WO02/104061

PCT Pub. Date: Dec. 27, 2002

(65) Prior Publication Data

US 2003/0153327 A1     Aug. 14, 2003

(30) Foreign Application Priority Data

Jun. 15, 2001   (JP)   ............................. 2001-182382

(51) Int. Cl.
*H04Q 7/20*   (2006.01)

(52) U.S. Cl. ............... 455/455; 455/452.2; 455/67.13; 370/335

(58) Field of Classification Search ............... 455/455, 455/452.1, 434, 435.2, 435.3, 450, 452.2, 455/437, 442; 370/437, 329

See application file for complete search history.

(56) References Cited

U.S. PATENT DOCUMENTS

| | | | | |
|---|---|---|---|---|
| 5,809,419 A | * | 9/1998 | Schellinger et al. | ......... 455/434 |
| 5,953,665 A | * | 9/1999 | Mattila | ....................... 455/434 |
| 6,085,085 A | * | 7/2000 | Blakeney et al. | ......... 455/426.1 |
| 6,185,422 B1 | | 2/2001 | Mattila | |
| 6,321,097 B1 | * | 11/2001 | Kim | ......................... 455/553.1 |
| 6,810,254 B2 | * | 10/2004 | Tiedemann et al. | ....... 455/552.1 |
| 6,928,285 B2 | * | 8/2005 | Hunzinger | ............... 455/452.1 |

FOREIGN PATENT DOCUMENTS

| | | | | |
|---|---|---|---|---|
| JP | 08037686 A | * | 2/1996 | |
| JP | 11505392 | * | 5/1999 | |
| JP | 20001115860 A | * | 4/2000 | |
| WO | WO-99/29134 A1 | | 6/1999 | |
| WO | WO-01/33881 A1 | | 5/2001 | |

* cited by examiner

Primary Examiner—Temica Beamer
(74) Attorney, Agent, or Firm—Lerner, David, Littenberg, Krumholz & Mentlik, LLP

(57) ABSTRACT

A portable communication equipment comprises a radio communication sections (13), (14) for transmitting and receiving a CDMA signal, a base band modem section (16) for modulating a speech signal into a CDMA signal and demodulating a CDMA signal into a speech signal, and a CPU (17) for controlling the transmission and reception of a CDMA signal. When the equipment fails in capturing a selected channel and falls in a condition when a system was lost, the CPU (17) retries to capture the selected channel. The CPU (17), when it fails in capturing the selected channel, selects another channel only when it tries to capture the selected channel for a predetermined number of times as well as it does not obtain an overhead message. With this arrangement, it is possible to capture an appropriate channel if an unsuitable channel is selected and the portable communication equipment falls into a condition when a system was lost.

4 Claims, 3 Drawing Sheets

CELLULAR COMMUNICATION APPARATUS AND CHANNEL CAPTURE METHOD

TECHNICAL FIELD

This invention relates to a portable communication equipment and a channel capturing method applicable to a mobile communication system realized on the basis of the code division multiple access (CDMA) technology.

BACKGROUND ART

The code division multiple access (CDMA) technology has been proposed in recent years for multiple access in mobile communication systems. The CDMA technology is adapted to multiplex signals that are modulated by the spread spectrum on a radio transmission line (to be referred to as channel hereinafter) defined by using a code specific to each user of the same radio frequency.

Roughly classifying, two methods are known as the spread spectrum; direct sequence (DS) and frequency hopping (FH), of which the DS is designed to modulate the carrier wave by means of a PN (pseud noise) signal code that shows a bit rate greater than the information rate to be used for communication and transmit the signal with a spread frequency band. The receiving side takes out only the signal showing a bit string same as the PN signal code from the received radio wave and demodulates it to obtain the original information. With this arrangement, the interference and noise components that are overlaid on the proper signal on the transmission line can be removed by the technique of spread spectrum at the time of demodulation.

A mobile terminal, which is designed for use with the CDMA technology and may typically be a portable phone, is adapted to select a channel to be used for transmission of information before making a call (for signal transmission) or receiving a call (for signal reception) and transmitting/receiving messages and start capturing the selected channel. Upon capturing the selected channel, it obtains information on the configuration of the captured channel and the timing of operation and synchronizes the timing of operation of itself and that of the captured channel.

FIG. 1 of the accompanying drawing is a flow chart illustrating the sequence of operation of capturing a channel by means of a known channel capturing method.

Referring to the flow chart of FIG. 1, as power is supplied to the mobile terminal, it initializes one of the existing channels A and B, which may be selected arbitrarily. Subsequently, it tries to capture the initialized channel. Therefore, if, for example, the channel A is initialized, the mobile terminal 1 tries to capture the channel A.

If the mobile terminal 1 fails to capture the initialized channel A, it selects a channel that is not the initialized channel, or the channel B, (ST11) and tries to capture the channel B (ST12).

After trying to capture the selected channel B, the processing operation of the mobile terminal 1 proceeds to Step ST13, where it determines if it has succeeded in capturing the selected channel B or not by referring to the ID number of the base station and certain parameters such as the field strength for signal reception.

If it is determined in Step ST13 that the channel B has not been captured, the effort for capturing the channel is regarded to have met with failure (ST14).

If, on the other hand, it is determined in Step ST13 that the channel B has been captured by the mobile terminal so as to effectively receive messages by way of the channel specified by the channel list message that is addressed to it, the mobile terminal moves into a standby state of being ready for receiving a signal without falling into a condition when a system was lost (ST15).

However, the mobile terminal may fail in capturing a channel A showing a high field strength but succeed in capturing a channel showing a low field strength.

Assume here, for instance, that the channel A shows a high field strength while the channel B shows a low field strength and the mobile terminal fails in capturing the channel A which it has initialized so that it selects the channel B in Step ST11 and succeeds in capturing the channel B. Then, it is no longer possible for the mobile terminal to effectively receive any message by way of the channel specified in the channel list message addressed to it and the mobile terminal falls in a condition when a system was lost because it captures the channel B showing a low field strength (ST16).

Thus, the prior art is accompanied by the problem that, once the mobile terminal falls in a condition when a system was lost, it keeps on trying to capture the specified channel in a condition when a system was lost as shown in FIG. 1. The net result is that the mobile terminal no longer effectively receive any message and remains in a condition when a system was lost.

DISCLOSURE OF THE INVENTION

In view of the above identified circumstances, it is therefore the object of the present invention to provide a portable communication equipment and a channel capturing method that can capture an appropriate channel if it has not captured an aiming channel and fallen in a condition when a system was lost.

In an aspect of the invention, the above object is achieved by providing a portable communication equipment adapted to transmit and receive a code division multiple access (CDMA) signal with a base station connected to a public communication network, comprising:

radio communication means for transmitting and receiving a CDMA signal;

base band modem means for modulating a speech signal into a CDMA signal and demodulating a CDMA signal into a speech signal; and control means for controlling the transmission and reception of a CDMA signal;

wherein said control means, when it fails in capturing a selected channel, selects another channel only when it tries to capture the selected channel for a predetermined number of times as well as it does not obtain any overhead message.

In another aspect of the invention, there is provided a channel capturing method to be applied to a portable communication equipment comprising a radio communication section for transmitting and receiving a code division multiple access (CDMA) signal with a base station connected to a public communication network, a base band modem section for modulating a speech signal into a CDMA signal and demodulating a CDMA signal into a speech signal, and a control section for controlling the transmission and reception of a CDMA signal, wherein, when a selected channel cannot be captured, another channel is selected only when the selected channel is tried to be captured for a predetermined number of times as well as no overhead message is obtained.

BEST MODE FOR CARRYING OUT THE INVENTION

Now, the present invention will be described by referring to the accompanying drawings that illustrate a preferred embodiment of the invention.

The illustrated embodiment is a mobile terminal 1 that can be applied to a mobile communication system realized on the basis of the CDMA technology.

Figure 1:
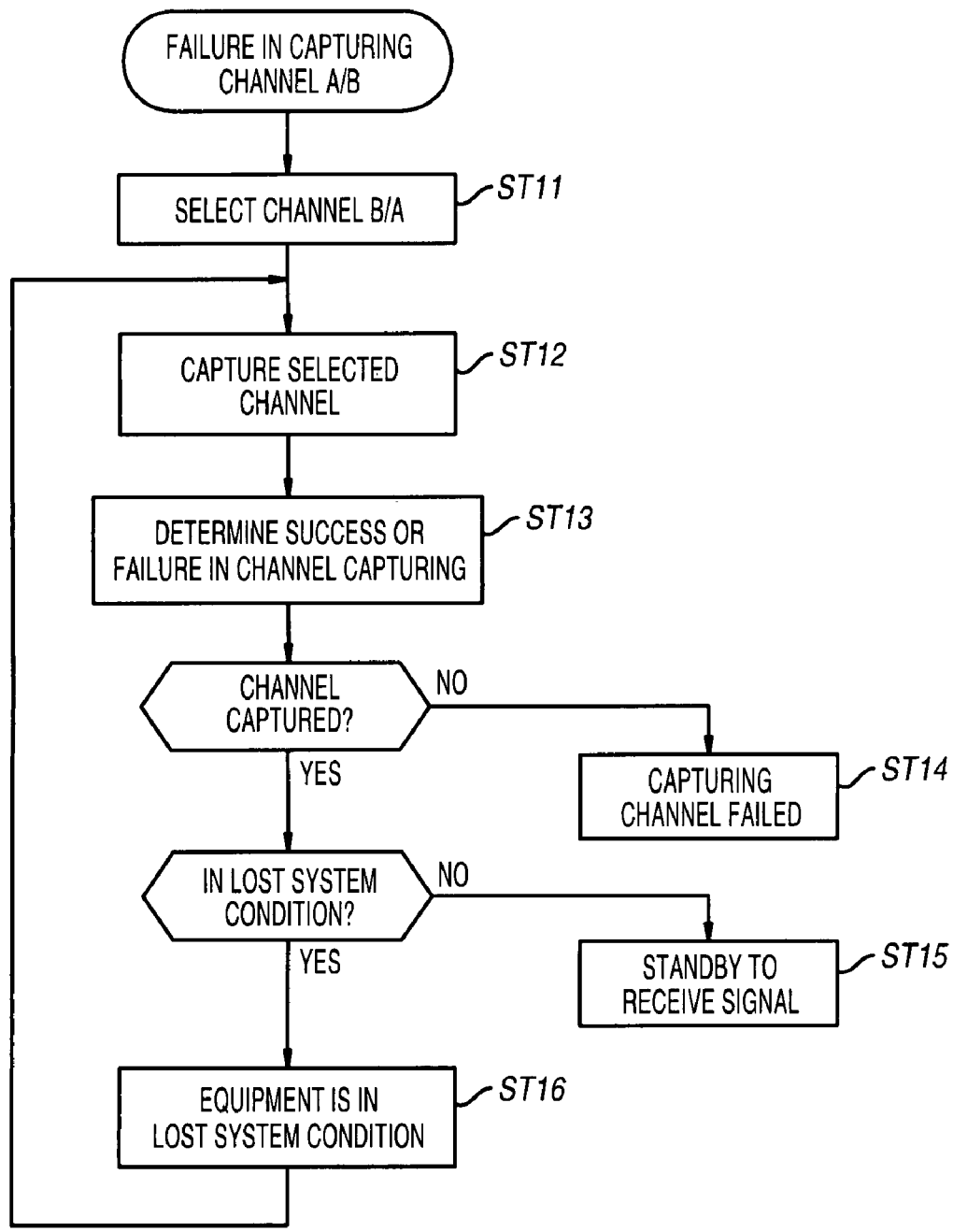
FIG. 1 is a flow chart illustrating the sequence of operation of capturing a channel by means of a known channel capturing method.
Figure 2:
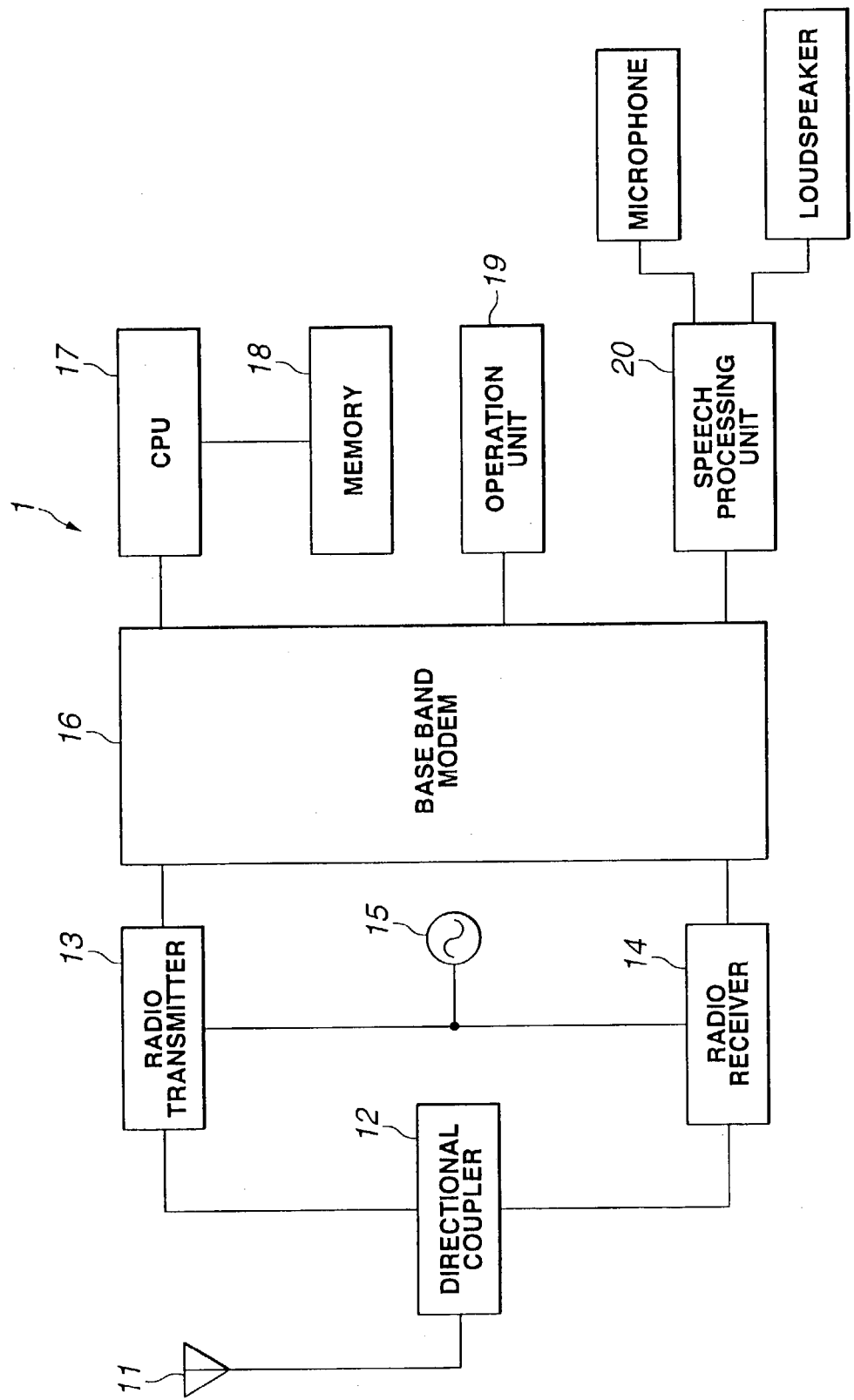
FIG. 2 is a schematic block diagram of an embodiment of portable communication equipment according to the invention, which is a mobile terminal.

FIG. 2 is a schematic block diagram of the mobile terminal 1. As shown in FIG. 2, the mobile terminal 1 comprises an antenna 11, a directional coupler 12, a radio transmitter 13, a radio receiver 14, a local oscillator 15, a base band modem 16, a CPU 17, a memory 18, an operation unit 19 and a speech processing unit 20.

The antenna 11 is a shared antenna that can be used for both transmitting CDMA signals to and receiving CDMA signals from a base station and is connected to the radio transmitter 13 and the radio receiver 14 by way of the directional coupler 12.

The directional coupler 12 typically comprises a dielectric filter and, as pointed out above, can be used for both transmitting CDMA signals to and receiving CDMA signals from the base station. The directional coupler 12 is connected on the one hand to the antenna 11 and on the other to the radio transmitter 13 and the radio receiver 14. The mobile terminal 1 may alternatively be so configured as to comprise no directional coupler.

The radio transmitter 13 converts the CDMA signal input from the base band modem 16 with an intermediate frequency band into a signal showing a radio frequency band and outputs the obtained signal to the antenna 11 by way of the directional coupler 12.

The radio receiver 14 converts the CDMA signal input from the antenna 11 by way of the directional coupler 12 with a radio frequency band into a signal showing an intermediate frequency band and outputs the latter signal to the base band modem 16.

Both the radio transmitter 13 and the radio receiver 14 are connected to the local oscillator 15 and fed with a local oscillation frequency signal to be used for frequency conversion.

The base band modem 16 outputs CDMA signals to and inputs CDMA signals from the radio transmitter 13, the radio receiver 14 and the speech processing unit 20 and is adapted to perform processing operations such as those of spread spectrum, digital modulation/demodulation, multiplexing, information source coding and transmission line coding. For instance, when transmitting a CDMA signal, it performs an operation for a spread spectrum by carrying out an A/D conversion on a speech signal or a signal to be conveyed for communication that is input from the speech processing unit 20 and multiplying it with a PN code. When receiving a CDMA signal, on the other hand, it takes out only the signal having a bit string same as that of the multiplier PN code and demodulates it to produce a signal to be received properly for communication, which is then output to the speech processing unit 20. With this arrangement, it is possible to eliminate the interference and noise components, which are multiplexed to the proper signal somewhere on the transmission line, at the time of demodulation by means of a spread spectrum.

The CPU 17 is connected to the base band modem 16 and controls inputs and outputs of signals. The CPU 17 is also connected to the memory 18 so as to read out and execute programs stored in the memory 18.

The memory 18 is typically a flash memory that is adapted to store data in memory areas having specified respective addresses allocated to them. The memory 18 also stores the program defining the priority of candidate channels that the mobile terminal 1 observes when it tries to capture a channel and the procedure to be followed for capturing a channel, which will be described in greater detail hereinafter.

The operation unit 19 includes a power switch, dial keys and various buttons to be used for selecting functions and is designed to be operated by the user.

The speech processing unit 20 is connected to the base band modem 16 and operates for coding/decoding speech signals that are input and output by way of a microphone and a loudspeaker respectively. It also amplifies the speech signals to be output.

The mobile terminal 1, which is designed for use with the CDMA technology according to the invention, initializes the channel to be used for transmitting/receiving information before actually starting or receiving a call for transmitting or receiving a message, whichever appropriate, and starts capturing the channel. Then, it obtains information on the configuration and the timing of operation of the captured channel and synchronizes the timing of operation of its own and that of the captured channel.

Figure 3:
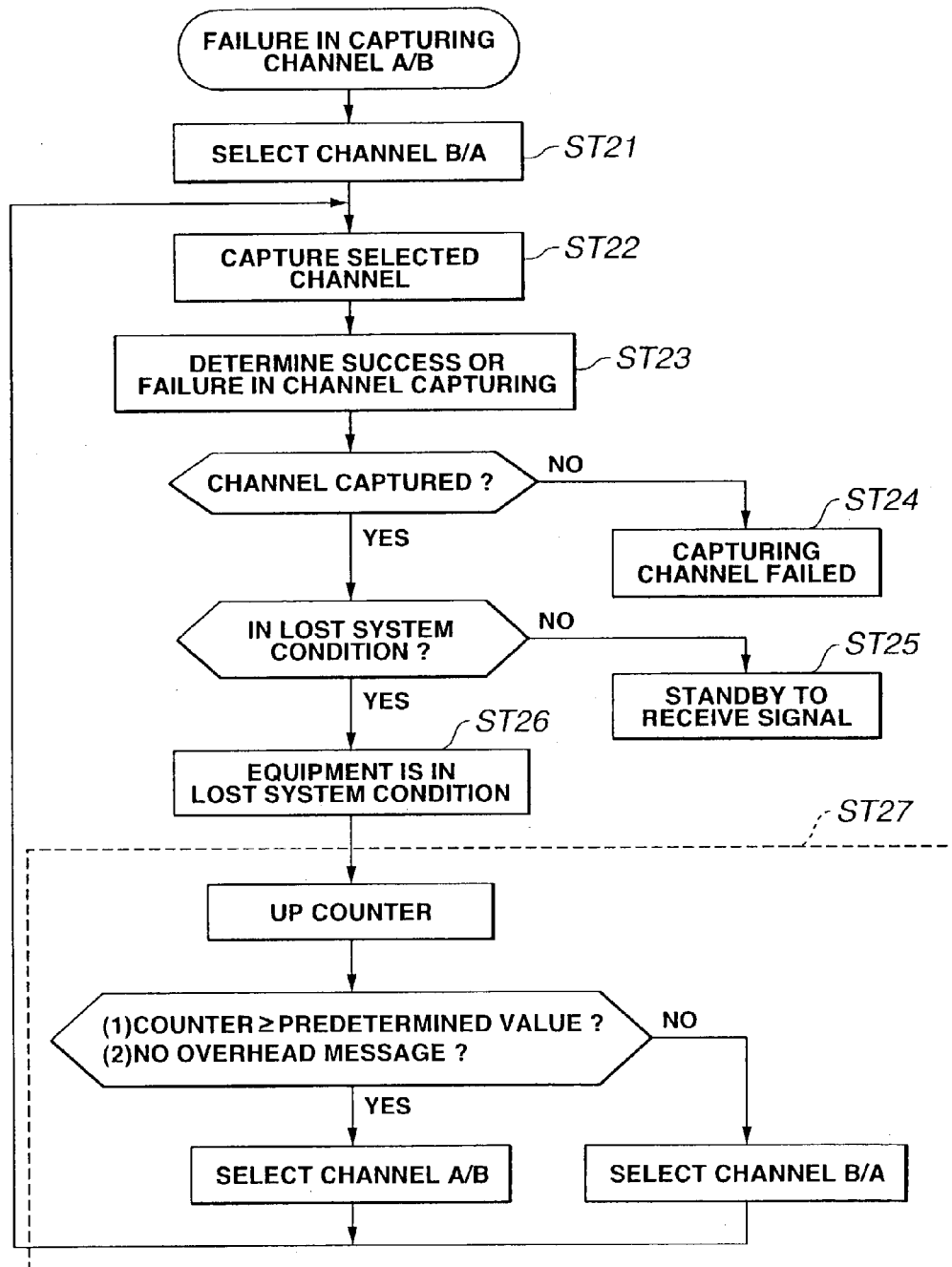
FIG. 3 is a flow chart illustrating the sequence of operation of capturing a channel by means of the embodiment of the invention, which is a mobile terminal.

The procedure of capturing a channel will be described in detail by referring to the flow chart of FIG. 3. Assume here that two channels, channel A and channel B are available.

As power is supplied to the mobile terminal 1 according to the invention, it initializes either of the existing channels A and B, which is selected arbitrarily. Subsequently, it tries to capture the initialized channel. Therefore, for example, if the channel A is initialized, the mobile terminal 1 tries to capture the channel A.

If the mobile terminal 1 fails to capture the initialized channel A, it selects the channel that is not the initialized channel, or the channel B, (ST21) and tries to capture the channel B (ST22).

After trying to capture the selected channel B, the processing operation of the mobile terminal 1 proceeds to Step ST23, where it determines if it has succeeded in capturing the selected channel B or not on the basis of the ID number of the base station and certain parameters such as the field strength for signal reception.

If it is determined in Step ST23 that the channel B has not been captured, the effort for capturing the channel is regarded to have met with failure (ST24).

If on the other hand, it is determined in Step ST23 that the channel B has been captured by the mobile terminal 1 without falling into a condition when a system was lost, the mobile terminal 1 moves into a standby state of being ready for receiving a signal (ST25).

As a result, the mobile terminal 1 can capture not the channel A but the channel B when the channel A shows a low field strength while the channel B shows a high field strength.

If the channel A shows a high field strength while the channel B shows a low field strength and the mobile terminal 1 fails in capturing the channel A which it has initialized but can capture the channel B, it is no longer possible for the mobile terminal 1 to receive any message by way of the channel specified in the channel list message addressed to it and the mobile terminal 1 falls in a condition when a system was lost (ST26).

If Such is the case, the mobile terminal 1 moves to a correction step, or Step ST27, where it performs the following processing operation.

A counter is provided in the collection step, or Step ST27. The counter shows an initial reading of 0 and, each time the correction step is activated, the reading of the counter is incremented by 1. Then, the reading of the counter is output. In other words, the numerical value output from the counter indicates the number of times by which the processing operation has been moved to the collection step of Step ST27 due to a condition when a system was lost.

Then, the following judgments are made in the collection step of Step S27.

1) If the reading of the counter is not less than a predefined value as well as 2) if the overhead message necessary for a standby state (the message including system information and the definition of the method for accessing the mobile terminal) has not been obtained yet.

The initialized channel A is selected as channel to be captured only when both of the requirements of 1) and 2) are met and then the processing operation proceeds to Step ST22, where the mobile terminal 1 tries to capture the channel A and initializes the counter.

If, on the other hand, both of the requirements 1) and 2) are not met, the processing operation proceeds to Step ST22, where the mobile terminal 1 tries to capture the channel that is defined as the channel to be captured in a condition when a system was lost (which is the channel B in this embodiment). Then, the reading of the counter is not modified.

The counter may be provided with any upper limit value that is not smaller than two.

If the mobile terminal 1 fails to capture the initialized channel A but captures the channel B showing a low field strength, it keeps on trying to capture the channel B until the reading of the counter gets to the defined upper limit value. If the mobile terminal falls in a condition when a system was lost while continuously trying to capture the channel B, it then tries to capture the channel A once again under certain conditions.

As a result, the mobile terminal 1 can receive the message easily and effectively by way of the channel specified by the channel list message, or the channel A, which shows a high field strength and the risk of falling into a condition when a system was lost is minimized.

A mobile terminal 1 according to the invention provides the following advantages.

It operates highly effectively particularly when it fails in capturing a channel showing a high field strength and subsequently succeeds in capturing a channel showing a low field strength, which is not suitable for communication but inevitably selected as a result of retrial. Then, if the mobile terminal 1 falls in a condition when a system was lost because it has captured the unsuitable channel and been unable to receive a message effectively, it can reselect the channel showing a high field strength after repeating the operation of capturing the unsuitable channel for a predetermined number of times. As a result, the mobile terminal 1 can receive the message easily and effectively and avoid a situation of continuously being in a condition when a system was lost.

While the sequence of operation of a mobile terminal 1 according to the invention is same as that of any conventional one from the start of power supply to the condition when a system was lost of Step ST26, a correction step, or Step ST27, is added to the sequence of operation of the mobile terminal 1 according to the invention to improve the probability of moving into a standby state of being ready for receiving a signal. In other words, the above identified effect can be obtained by simply adding a single correction step without significantly modifying the conventional program defining the sequence of operation of capturing a channel.

Since the correction step comes into the scene only after falling into a condition when a system was lost, the operation of capturing the most suitable channel is repeated after falling into such a condition.

A mobile terminal 1 according to the invention is not limited to the above described embodiment and the sequence of operation of capturing a channel can be used anytime when the terminal 1 is required to recapture a channel for some reason or another. In other words, it doe not necessarily have to come after the start of power supply.

As described above in detail, a portable communication equipment according to the invention is particularly effective when it fails in capturing a channel showing a high field strength and subsequently succeeds in capturing a channel showing a low field strength, which is not suitable for communication but inevitably selected as a result of retrial. Then, if the portable communication equipment falls in a condition when a system was lost because it has captured the unsuitable channel and been unable to receive a message effectively, it can reselect the channel showing a high field strength after repeating the operation of capturing the unsuitable channel for a predetermined number of times to consequently improve the probability of capturing a suitable channel and moving into a standby state of being ready for receiving a signal. Additionally, the portable communication equipment can avoid a situation where the unsuitable channel continues to be selected and the equipment remains in condition when a system was lost.

A portable communication equipment according to the invention is adapted to improve the probability of moving into a standby state of being ready for receiving a signal simply by adding a correction step to the program defining the sequence of operation of capturing a channel. In other words, the above identified effect can be obtained simply by adding a single correction step without significantly modifying the conventional program defining the sequence of operation of capturing a channel.

A channel capturing method according to the invention is particularly effective when it fails in capturing a channel showing a high field strength and subsequently succeeds in capturing a channel showing a low field strength, which is not suitable for communication but inevitably selected as a result of retrial. Then, if the channel capturing method falls in a condition when a system was lost because it has captured the unsuitable channel and been unable to receive a message effectively, it can reselect the channel showing a high field strength after repeating the operation of capturing the unsuitable channel for a predetermined number of times to consequently improve the probability of capturing a suitable channel and moving into a standby state of being ready for receiving a signal. Additionally, the channel capturing method can avoid a situation where the unsuitable channel continues to be selected and the method remains in condition when a system was lost.

A channel capturing method according to the invention is adapted to improve the probability of moving into a standby state of being ready for receiving a signal simply by adding a correction step to the program defining the sequence of operation of capturing a channel. In other words, the above identified effect can be obtained simply by adding a single correction step without significantly modifying the conventional program defining the sequence of operation of capturing a channel.

The invention claimed is:

1. A portable communication apparatus operable to transmit code division multiple access (CDMA) signals to and receive code division multiple access (CDMA) signals from a base station connected to a public communications network, said portable communication apparatus comprising:
   radio communication means for transmitting and receiving a CDMA signal over a channel arbitrarily selected from one or more existing channels;
   base band modem means for modulating a speech signal into a CDMA signal and for demodulating a CDMA signal into a speech signal; and
   control means for controlling the transmitting and receiving of the CDMA signal by said radio communication means;
   wherein in response to said portable communication apparatus being initially powered-on from a powered-off state,
      said control means arbitrarily selects a first channel from the one or more existing channels and attempts to capture the first channel, the first channel having a high field strength, and
      if said control means fails to successfully capture the first channel,
      said control means arbitrarily selects and captures a second channel from the one or more existing channels,
      if said control means then receives an overhead message over the second channel but the second arbitrarily selected channel has a low field strength so that said portable communication apparatus is in a lost condition, said control means successively attempts to capture the second channel for a predetermined number of respective capture attempts while said portable communication equipment remains in the lost condition, and
      if said control means does not receive the overhead message over the second channel or if the portable communication apparatus remains in the lost condition after said control means has successively attempted to capture the second channel for the predetermined number of respective capture attempts, said control means again attempts to capture the first channel.

2. In a portable communication apparatus that transmits code division multiple access (CDMA) signals to and receives code division multiple access (CDMA) signals from a base station connected to a public communications network, modulates a speech signal into a CDMA signal and demodulates a CDMA signal into a speech signal, and controls the transmitting and receiving of the CDMA signal over a channel arbitrarily selected from one or more existing channels, a channel capturing method comprising:
   initially powering-on the portable communication apparatus from a powered-off state; and
   in response to the portable communication apparatus being initially powered-on from the powered-off state,
      arbitrarily selecting a first channel from the one or more existing channels, the first channel having a high field strength,
      attempting to capture the first channel, and
      if the first channel is not successfully captured,
      arbitrarily selecting and capturing a second channel from the one or more existing channels,
      if an overhead message is received over the second channel but the second channel has a low field strength so that the portable communication apparatus is in a lost condition, successively attempting to capture the second channel for a predetermined number of respective capture attempts while the portable communication apparatus remains in the lost condition, and
      if the overhead message is not received over the second channel or if the portable communication apparatus remains in the lost condition after successively attempting to capture the second channel for the predetermined number of respective capture attempts, again attempting to capture the first channel.

3. The portable communication apparatus according to claim 1, further comprising:
   counter means for resetting when said control means first attempts to capture the second channel and for incrementing each time said control means thereafter attempts to capture the second channel.

4. The method according to claim 2, wherein a counter is reset when the second channel is initially captured and is incremented each time that capture of the second channel is thereafter attempted.

* * * * *

UNITED STATES PATENT AND TRADEMARK OFFICE
CERTIFICATE OF CORRECTION

| | | |
|---|---|---|
| PATENT NO. | : 7,299,053 B2 | |
| APPLICATION NO. | : 10/343807 | |
| DATED | : November 20, 2007 | |
| INVENTOR(S) | : Hiroshi Tajiri et al. | |

It is certified that error appears in the above-identified patent and that said Letters Patent is hereby corrected as shown below:

On the Title Page of the patent, in the Abstract Section (57), line 1, after "equipment", delete "comprises a", and insert --formed of--.

In the Abstract Section (57), line 2, after "sections", delete "(13), (14)".

In the Abstract Section (57), line 3, after "section", delete "(16)".

In the Abstract Section (57), line 6, after "CPU", delete "(17)".

In the Abstract Section (57), line 8, "in a" should read --into a lost--.

In the Abstract Section (57), line 9, after "CPU", delete "(17)".

In the Abstract Section (57), line 10, after "CPU", delete "(17)".

In the Abstract Section (57), line 11, after "tries", insert --unsuccessfully--.

In the Abstract Section (57), line 12, after "channel", delete "for".

In the Abstract Section (57), line 12, after "times", insert --,--.

In the Abstract Section (57), line 13, after "as", insert --when--.

In the Abstract Section (57), line 16, before "condition", insert --lost system--.

Column 5, line 9, "Such" should read --such--.

Signed and Sealed this

Eighteenth Day of August, 2009

David J. Kappos
*Director of the United States Patent and Trademark Office*